US008200565B2

(12) United States Patent
Broms et al.

(10) Patent No.: US 8,200,565 B2
(45) Date of Patent: Jun. 12, 2012

(54) ADJUSTABLE DERIVATIVE SECURITIES AND METHOD FOR ADJUSTING THE VALUE OF SAME DUE TO A CORPORATE EVENT

(76) Inventors: Peter A. Broms, Glen Ridge, NJ (US); Andrew M. Scott, Brooklyn, NY (US)

( * ) Notice: Subject to any disclaimer, the term of this patent is extended or adjusted under 35 U.S.C. 154(b) by 0 days.

(21) Appl. No.: 12/972,383

(22) Filed: Dec. 17, 2010

(65) Prior Publication Data

US 2011/0087621 A1    Apr. 14, 2011

Related U.S. Application Data

(63) Continuation-in-part of application No. 12/475,977, filed on Jun. 1, 2009, which is a continuation-in-part of application No. 10/154,742, filed on May 24, 2002, application No. 12/972,383, which is a continuation-in-part of application No. 11/588,807, filed on Oct. 27, 2006, which is a continuation-in-part of application No. 10/154,742, filed on May 24, 2002.

(51) Int. Cl.
*G06Q 40/00* (2012.01)
(52) U.S. Cl. .................................................. 705/36 R
(58) Field of Classification Search ............... 705/35–45
See application file for complete search history.

(56) References Cited

U.S. PATENT DOCUMENTS

2001/0037277 A1   11/2001   Willis et al.

OTHER PUBLICATIONS

Jack Clark Francis, et al., "The Handbook of Equity Derivatives," *Irwin Professional Publishing*, Chapter 13, pp. 284-329.
Robert Hunter, "Players: Peter Broms: 11 Years and Counting", *Derivative Strategy*, p. 4, Jul. 1999.
Tom Pratt, "Phlx takes on Amex with new Americus securities" *Investment Dealers Diciest*, p. 14 (Jan. 30, 1995).
David Mayers et al., "Journal of Applied Corporate Finance", *Bank of America*, vol. 15, No. 1, pp. 128-136 (Spring 2000).
Options Clearing Corporation, "Characteristics and Risk of Standardized Options", Feb. 1994, pp. 19-21,33.
Robert Geske, "The Pricing of Options with Stochastic Dividend Yield", The Journal of Finance, vol. 33, No. 2, May 1978, pp. 620-621.
Fischer Black et al., "The Pricing of Options and Corporate Liabilities", The Journal of Political Economy, vol. 81, No. 3, May-Jun. 1973, p. 639.
Clifford W. Smith et al., "Valuing Employee Stock Option Plans Using Option Pricing Models", Journal of Accounting Research, vol. 14, No. 2, Autumn 1976, p. 362.

*Primary Examiner* — Thomas M Hammond, III
(74) *Attorney, Agent, or Firm* — IM IP Law PLLC; C. Andrew Im

(57) ABSTRACT

The claimed invention relates to an adjustable derivative contract. Particularly a method and system for adjusting the derivative contract to account for time value of money due to an occurrence of a corporate event that affects the value of the derivative contract. The claimed method and system allocates distributions amongst different derivative contracts, each derivative contract representing a different economic interest of at least two shares of an underlying security. The claimed invention uses the concepts of present and future values to value derivative contracts in order to more fairly and accurately represent the interests of the various holders of such derivative contracts upon the occurrence of a corporate event affecting the value of these derivative contracts.

41 Claims, 5 Drawing Sheets

ADJUSTABLE DERIVATIVE SECURITIES AND METHOD FOR ADJUSTING THE VALUE OF SAME DUE TO A CORPORATE EVENT

RELATED APPLICATION

The present application is a continuation-in-part application of U.S. application Ser. No. 12/475,977 filed Jun. 1, 2009, which is a continuation-in-part application of U.S. application Ser. No. 10/154,742 filed May 24, 2002, each of which is incorporated herein by reference in its entirety. The present application is a continuation-in-part application of U.S. application Ser. No. 11/588,807 filed Oct. 27, 2006, which is a continuation-in-part application of U.S. application Ser. No. 10/154,742 filed May 24, 2002, each of which is incorporated herein by reference in its entirety.

BACKGROUND OF THE INVENTION

The financial industry created derivative securities (or derivatives) as a way to reallocate risk, create leverage, and provide a wider range of investment opportunities for its clients. These are securities whose prices are determined by, or "derive from," the prices of other securities. Popular examples of derivative securities include options and futures contracts. Standardized forms of these derivatives now regularly trade on various national and international exchanges. Because the value of derivatives depends on the value of the underlying securities, these can be powerful tools for hedging and speculation.

Option contracts, for example, are written on a variety of securities, such as common stock, stock indexes, foreign currency, agricultural commodities, precious metals, and interest rate futures. An investor may wish to purchase a call option, which allows the investor (option holder) to purchase the underlying security at a specified price (known as the exercise or strike price) during a fixed time period, if the investor believes the value of the underlying security will rise during that time period. For an American style option contract, if the price of the underlying stock rises above the strike price at any time during the fixed time period, the option holder may exercise his option to purchase the underlying common stock at the strike price and then immediately sell it at the market price. The option holder will only realize a profit if the difference between the market price and the strike price is greater than the original investment (premium) paid for the option contract. If the price of the underlying security does not rise above the strike price during the fixed time period, the option holder simply allows the option contract to expire, and his losses consist only of the premium paid for the option contract. A European option, in contrast, can only be exercised on the expiration date and would only be exercised if the stock is trading above the strike price on the expiration date.

An investor may also purchase a put option, which allows the option holder to sell the underlying security at a specified strike price during a fixed time period, if he believes that the value of the underlying security will drop during the fixed time period. For an American style option contract, if the price of the underlying security drops below the strike price at any time during the fixed time period, the option holder may exercise his option to sell the underlying security at the strike price. In order to exercise a put option, the option holder does not have to own the underlying security. Upon exercise, the investor's broker purchases the necessary shares/units of the underlying security at the market price and immediately delivers (or "puts" them) to an option writer for the strike price. The option holder will only realize a profit if the difference between the strike price and the market price of the underlying securities upon exercise is greater than the premium paid for the option. Again, if the price of the underlying security does not drop below the strike price during the fixed time period, the option holder can just allow the option contract to expire and lose no more than the premium paid for that option.

Conversely, the writers of call and put options generally sell these option contracts for a premium. They write options on the underlying securities for a variety of reasons. Security owners who feel bullish about their security may write a put option feeling that they can gain a premium of the option contract without risking much in return. Security owners may write a call option as a way of enforcing their sell disciplines. If an investor would sell their security if it reached a certain price in accordance with a disciplined investing strategy regardless of the surrounding circumstances, then such investors can write a call option to enforce that strategy and gain a premium in addition. Traditionally, equity options are created as contracts on 100 shares of the underlying stock. They are always created by purchasing an option, resulting in a long position, or writing an option, resulting in a short position. These are referred to as opening transactions. The option contracts are terminated by one of (a) letting the option expire, (b) exercising the contract, or (c) reversing the opening transaction in the market place. These are referred to as closing transactions.

The benefits associated with option contracts, which are only one form of derivative securities, are numerous. Investors can use them as hedging devices for minimizing risk. For example, an owner of a security may buy a put option on that security at a price that provides the investor with the comfort of knowing that he cannot lose more than a set amount of money for a specified time period. Investors can also enforce certain sell disciplines by writing call options as described above. Additionally, investors can speculate and leverage their stake in an underlying security through the purchase of call options in that underlying security as opposed to the purchase of the actual security. Combinations of the buying and selling of these simple option contracts provides a variety of products for the financial industry to offer its customers, appealing to the various investing strategies belonging to a wide range of customers.

The problem with the current treatment of option contracts is that upon the occurrence of a corporate event, such as a liquidating distribution, the holder of the derivative security must exercise any rights at that time or allow the security to expire. For example, assume that a corporate event has triggered liquidation of the common stock of a Company XYZ, with full distribution rights upon liquidation. Regardless of the price of the stock upon liquidation, the holder of a call option (the "holder") must now decide whether to exercise his option to purchase the common stock at the strike price and sell at the liquidating price. Even if the holder makes a profit upon such an occurrence, the holder does not gain the true benefit of the bargain contemplated when he entered into the option contract. He loses the remaining time period in which the underlying common stock could have appreciated even further. The holder paid a premium to speculate on the underlying stock for a specified time period, and now that period is getting shortened without an adjustment for the loss of time, for which the holder has already paid. There is a need for a process that accounts for the value of time when the holder is forced to exercise his option contract before the specified time period has expired, or when any investor is forced to exercise a derivative security before the bargained for time period has come to an end.

OBJECTS AND SUMMARY OF THE INVENTION

It is an object of the claimed invention to properly allocate gains and losses on investments in the adjustable derivative contracts upon the occurrence of corporate events related to the underlying securities, which cause the allotted time period for such derivatives to prematurely expire.

It is also an object of the claimed invention to adjust the value of the adjustable derivative contract representing an economic interest of a security upon their premature expiration to reflect the value of the time lost.

It is another object of the claimed invention to utilize the concept of present value to properly discount the value of the adjustable derivative contract upon their premature expiration to reflect the value of the time lost.

It is a further object of the claimed invention to properly adjust the value of and number of shares/units of a security underlying the adjustable derivative contract upon a corporate event related to the underlying securities to properly reflect such event.

It is still a further object of the claimed invention to utilize the concept of present value in properly adjusting the number of shares/units of a security underlying the adjustable derivative contract upon a corporate event relating to the underlying security to properly reflect such event.

It is yet another object of the claimed invention that the allocation of the results of a corporate event among the adjustable derivative contracts be as fair as possible to the various holders of the adjustable derivative contracts.

It is still yet another object of the claimed invention that the originator or creator of the adjustable derivative contracts related to a security or stock experiencing a corporate event is never liable for more than the value of the security or stock underlying the adjustable derivative contracts, thus allowing the originator of the adjustable derivative contracts from a covered position to be fully hedged over the life of the adjustable derivative contracts.

The claimed invention relates to adjustable derivative contracts and a method for providing investors in the adjustable derivative contracts the fair value of their investment upon the occurrence of an event related to the underlying security that forces such investors to exercise their adjustable derivative contracts before the time period allotted to the derivative contracts has expired. In accordance with an exemplary embodiment of the claimed invention, the time value of money is used to readjust the value of the derivative contracts for the holder of the derivative contract as well as the investor who has written the derivative contract. The claimed invention further relates to adjustable derivative contracts and a method for generating and adjusting derivative or option contracts that trade based on two or more shares/units of the underlying security.

In accordance with an exemplary embodiment of the claimed invention, upon the occurrence of a corporate event related to the underlying security, for which the derivative contract's allotted time period prematurely expires, the exercise price or the termination claim of the derivative contract is readjusted to reflect the value of the time lost upon such premature expiration. The adjustment of the exercise price or termination claim is based on a discount rate "r" selected to approximate the true time value of money. This can be the interest rate on a designated Treasury security maturing soon after the termination date of the derivative contract. The discount or adjustment of the exercise price or termination claim may equate to a raising or lowering of the price according to the nature of the derivative contract. Any predetermined formula may be used to approximate the time value of money and discount the exercise price or termination claim. A discounting formula, which is utilized in illustrative examples infra, is used to lower the exercise price or termination claim according to its present value as follows:

$$PV = E/(1+r)^y$$

PV is the new exercise price or new termination claim adjusted to reflect its present value; E is the old exercise price or old termination claim; r is the discount rate, which may be chosen to most accurately reflect the time value of money; and y is the time that remains after a premature expiration of the allotted time period for a derivative contract, expressed in the same units as the discount rate. A related formula with the same variables, also utilized in illustrative examples herein, is used to raise the exercise price or termination claim to its future value as follows:

$$FV = E*(1+r)^y$$

In accordance with an exemplary embodiment of the claimed invention, factors other than the exercise price or termination claim of the derivative contract may be adjusted, upon an event that causes premature expiration, to provide the holder and writer of such derivative contract with a fairer distribution of the underlying asset. One such factor is the income or dividend stream of the security, which may be adjusted by taking the present value of the remaining nominal dividends at the discount rate as follows:

$$PV = \sum_{i=1}^{N} D_i / (1+r)_i^y$$

This time PV would be the present value of the stream of income; N is the number of remaining payments; the $D_i$ are the stream of income or dividend payments; again r is the discount rate; and the $y_i$ are the times to each of the $D_i$ dividend payments in the future.

In accordance with an exemplary embodiment of the claimed invention, a method adjusts a derivative contract to account for time value of money due to an occurrence of a corporate event that affects the value of the derivative contract. The claimed method adjusts the termination claim of the derivative contract to account for time value of money by a processor, thereby affecting the value of the derivative contract. The derivative contract is based on one of the economic interests of at least two shares/units of an underlying security. The claimed method further adjusts one or more terms of the derivative contract based on the distributions to the underlying security by the processor, and stores the adjusted price and the adjusted derivative contract in a database.

In accordance with an exemplary embodiment of the claimed invention, the aforesaid claimed method further allocates the value of at least two shares/units of underlying security to a plurality of derivative contracts. Each derivative contract represents one of the economic interests of at least two shares/units of the underlying security.

In accordance with an exemplary embodiment of the claimed invention, the plurality of derivative contacts comprises a dividend value of stock (DIVS) contract representing a stream of dividends distributed to a holder of at least two shares of the underlying security, an option with limited stock (OWLS) contract representing a nucleus of at least two shares of the underlying security, and a residual interest in stock (RISKS) contract representing a speculation on future gains on the value of at least two shares of the underlying security.

The derivative contract is a DIVS contract. In accordance with an exemplary embodiment of the claimed invention, the aforesaid claimed method further adjusts the term of the DIVS contract based on a remaining stream of dividends expected on the underlying security by the processor and stores the adjusted DIVS contract in the database.

In accordance with an exemplary embodiment of the claimed invention, the aforesaid claimed method further adjusts the value of the derivative contract by the processor based on at least one of the following: the amount of distributions related to the corporate event or the form of distributions related to the corporate event; and stores the adjusted derivative contract in the database.

In accordance with an exemplary embodiment of the claimed invention, the aforesaid claimed method further adjusts the termination claim by the processor based on at least one of the following: a risk free rate of return or a predetermined rate; and stores the adjusted termination claim in the database.

The corporate event is a full liquidating dividend. In accordance with an exemplary embodiment of the claimed invention, the aforesaid claimed method further adjusts the termination claim to the present value of the termination claim by the processor, and stores the adjusted termination claim in the database. In accordance with an exemplary aspect of the claimed invention, the derivative contract is a DIVS contract and the aforesaid claimed method further adjusts the value of the DIVS contract to a present value of a remaining stream of dividends expected on the underlying security by the processor, and stores the adjusted value of the DIVS contract in the database. In accordance with another exemplary aspect of the claimed invention, the derivative contract is an OWLS contract and the aforesaid claimed method further adjusts the term of the OWLS contract to receive a payment that is the lesser of a present value of a termination claim of the OWLS contract or the full liquidating dividend less payment to the DIVS contract, and stores the adjusted OWLS contract in the database.

The corporate event is a partial liquidating dividend and the derivative contract is a DIVS contract. In accordance with an exemplary embodiment of the claimed invention, the aforesaid claimed method further adjusts the value of the DIVS contract to a present value of a remaining stream of dividends expected on the underlying security which will no longer be paid due to the partial liquidating dividend; and stores the adjusted value of the DIVS contract in the database. In accordance with an exemplary aspect of the claimed invention, the derivative contract is an OWLS contract and the aforesaid claimed method further adjusts the term of the OWLS contract to receive a payment that is the lesser of a present value of a termination claim of the OWLS contract or the partial liquidating dividend less payment to the DIVS contract, and stores the adjusted OWLS contract in the database. In accordance with another exemplary aspect of the claimed invention, the aforesaid claimed method further adjusts the termination claim based on the future value of the partial liquidating dividend paid to the OWLS contract by the processor; and stores the adjusted termination claim in the database.

The corporate event is a special dividend and the derivative contract is a DIVS contract. In accordance with an exemplary embodiment of the claimed invention, the aforesaid claimed method further adjusts the value of the DIVS contract to receive a specified percentage of the special dividend by the processor; adjusts the termination claim based on a future value of the special dividend less any distribution made to the DIVS contract by the processor; and stores the adjusted termination claim and the adjusted value of the DIVS contract in the database. In accordance with an exemplary aspect of the claimed invention, the derivative contract is an OWLS contract, and the aforesaid claimed method adjusts the term of the OWLS contract to receive a payment that is the lesser of a present value of termination claim of the OWLS contract or the special dividend less payment to the DIVS contract, and stores the adjusted OWLS contract in the database.

In accordance with an exemplary embodiment of claimed invention, the aforesaid claimed method further adjusts the termination claim based on a change in structure of underlying securities due to the corporate event. In accordance with an aspect of the claimed invention, the corporate event is a spin-off or split-up resulting in multiple entities and the aforesaid claimed method further allocates the termination claim amongst the multiple entities and stores allocation of the termination claim amongst the multiple entities in the database.

The derivative contract is a European style derivative contract. In accordance with an exemplary embodiment of the claimed invention, the aforesaid claimed method further forces a premature liquidation of the European style derivative contract.

In accordance with an exemplary embodiment of the claimed invention, the plurality of derivative contracts comprises an option with limited stock (OWLS) contract representing a nucleus of at least two shares of the underlying security, and a residual interest in stock (RISKS) contract representing speculation on future gains on the value of at least two shares of the underlying security.

The corporate event is a full liquidating dividend and the derivative contract is an OWLS contract. In accordance with an exemplary embodiment of the claimed invention, the aforesaid claimed method further adjusts the termination claim to the present value of the termination claim by the processor; adjusts the term of the OWLS contract to receive the full liquidating dividend up to the adjusted termination claim; and stores the adjusted termination claim and the adjusted OWLS contract in the database.

The corporate event is a partial liquidating dividend and the derivative contract is an OWLS contract. In accordance with an exemplary embodiment of the claimed invention, the aforesaid method further adjusts the term of the OWLS contract to receive the partial liquidating dividend up to a present value of a termination claim of the OWLS contract; adjusts the termination claim based on a future value of the partial liquidating dividend paid to the OWLS contract by the processor; and stores the adjusted termination claim and the adjusted OWLS contract in the database.

The corporate event is a special dividend and the derivative contract is an OWLS contract. In accordance with an exemplary embodiment of the claimed invention, the aforesaid method further adjusts the term of the OWLS contract to receive the special dividend up to a present value of a termination claim of the OWLS contract; adjusts the termination claim based on a future value of the special dividend paid to the OWLS contract by the processor; and stores the adjusted termination claim and the adjusted OWLS contract in the database.

In accordance with an exemplary embodiment of the claimed invention, a non-transitory computer readable storage medium comprises computer executable code for adjusting a derivative contract to account for time value of money due to an occurrence of a corporate event that affects the value of the derivative contract. The claimed code comprises instructions for adjusting a termination claim of the derivative contract to account for time value of money by a processor, thereby affecting the value of the derivative contract. The derivative contract is based on one of the economic interests of at least two shares/units of an underlying security. The claimed code further comprises instructions for the processor to adjust the term of the derivative contract based on distributions to the underlying security and to store the adjusted termination claim and the adjusted derivative contract in a database.

In accordance with an exemplary embodiment of the claimed invention, aforesaid code further comprises instructions for the processor to allocate a value of at least two shares/units of the underlying security into a plurality of derivative contracts. Each derivative contract represents one of the economic interests of at least two shares/units of the underlying security. The plurality of derivative contracts comprises a dividend value of stock (DIVS) contract representing a stream of dividends distributed to a holder of at least two shares of the underlying security; an option with limited stock (OWLS) contract representing a nucleus of at least two shares of the underlying security, and a residual interest in stock (RISKS) contract representing speculation on future gains on the value of at least two shares of the underlying security.

The derivative contract is a DIVS contract. In accordance an exemplary embodiment of the claimed invention, the aforesaid code further comprises instructions for the processor to adjust the term of the DIVS contract based on a remaining stream of dividends expected on the underlying security and to store the adjusted DIVS contract in the database.

In accordance with an exemplary embodiment of the claimed invention, the aforesaid code further comprises instructions for the processor to adjust the term of the derivative contract based on at least one of the following: the amount of distributions related to the corporate event or the form of distributions related to the corporate event. The aforesaid code further comprises instructions for the processor to adjust the termination claim based on at least one of the following: a risk free rate of return or a predetermined rate. Preferably, the aforesaid code further comprises instructions for storing the adjusted terms of the derivative contract in the database.

The derivative contract is a DIVS contract and the corporate event is a full liquidating dividend. In accordance with an exemplary embodiment of the claimed invention, the aforesaid code further comprises instructions for the processor to adjust a value of the DIVS contract to a present value of a remaining stream of dividends expected on the underlying security, to adjust the termination claim to the present value of the termination claim, and to store the adjusted termination claim and the adjusted value of the DIVS contract in the database. In accordance with an exemplary aspect of the claimed invention, the derivative contract is an OWLS contract and the code further comprises instructions for the processor to adjust the term of said OWLS contract to receive a payment that is the lesser of a present value of a termination claim of the OWLS contract or the full liquidating dividend less payment to the DIVS contract; and to store the adjusted OWLS contract in the database.

The corporate event is a partial liquidating dividend and the derivative contract is a DIVS contract. In accordance with an exemplary embodiment of the claimed invention, the aforesaid code further comprises instructions for the processor to adjust the value of the DIVS contract to a present value of a remaining stream of dividends expected on the underlying security which will no longer be paid due to the partial liquidating dividend; and to store the adjusted value of the DIVS contract in the database. In accordance with an exemplary aspect of the claimed invention, the derivative contract is an OWLS contract and the aforesaid code further comprises instructions for the processor to adjust the terms of the OWLS contract to receive a payment that is the lesser of a present value of a termination claim of the OWLS contract or the partial liquidating dividend less payment to the DIVS contract; and to store the adjusted OWLS contract in the database. In accordance with another exemplary aspect of the claimed invention, the aforesaid code further comprises instructions for the processor to adjust the termination claim based on a future value of the partial liquidating dividend paid to the OWLS contract; and to store the adjusted termination claim in the database.

The corporate event is a special dividend and the derivative contract is a DIVS contract. In accordance with an exemplary embodiment of the claimed invention, the aforesaid code further comprises instructions for the processor to adjust the value of the DIVS contract to receive a specified percentage of the special dividend, to adjust the termination claim based on a future value of the special dividend less any distribution made to the DIVS contract, and to store the adjusted termination claim and the adjusted value of the DIVS contract in the database. In accordance with an exemplary aspect of the claimed invention, the derivative contract is an OWLS contract, and the aforesaid code further comprises instructions for the processor to adjust the term of the OWLS contract to receive a payment that is the lesser of a present value of a termination claim of the OWLS contract or the special dividend less payment to the DIVS contract; and to store the adjusted OWLS contract in the database.

In accordance with an exemplary embodiment of the claimed invention, a system for adjusting a derivative contract to account for time value of money due to an occurrence of a corporate event that affects the value of the derivative contract comprises a processor and a database. The processor adjusts a termination claim of the derivative contract to account for time value of money, thereby affecting the value of the derivative contract, and adjusts a term of the derivative contract based on distributions to an underlying security. The derivative contract is based on one of the economic interests of at least two shares/units of the underlying security. The database stores the adjusted termination claim and the adjusted derivative contract.

In accordance with an exemplary embodiment of the claimed invention, the processor allocates a value of at least two shares/units of the underlying security to a plurality of derivative contracts. Each derivative contract represents one of the economic interests of at least two shares/units of the underlying security. The plurality of derivative contracts comprises a dividend value of stock (DIVS) contract representing a stream of dividends distributed to a holder of at least two shares of the underlying security; an option with limited stock (OWLS) contract representing a nucleus of at least two shares of the underlying security, and a residual interest in stock (RISKS) contract representing speculation on future gains on the value of at least two shares of the underlying security.

The derivative contract is a DIVS contract. In accordance with an exemplary embodiment of the claimed invention, the processor adjusts the term of the DIVS contract based on a remaining stream of dividends expected on the underlying security and the database stores an adjusted DIVS contract.

In accordance with an exemplary embodiment of the claimed invention, the processor adjusts the term of said derivative contract based on at least one of the following: the amount of distributions related to the corporate event or the form of distributions related to the corporate event. Additionally, the processor adjusts the termination claim based on at least one of the following: a risk free rate of return or a predetermined rate. The database stores the adjusted derivative contract.

The derivative contract is a DIVS contract and the corporate event is a full liquidating dividend. In accordance with an exemplary embodiment of the claimed invention, the processor adjusts a value of the DIVS contract to a present value of a remaining stream of dividends expected on the underlying security, and adjusts the termination claim to the present value of the termination claim. The database stores the adjusted termination claim and the adjusted value of the DIVS contract. In accordance with an aspect of the claimed invention, the derivative contract is an OWLS contract, the processor adjusts the term of the OWLS contract to receive a payment that is the lesser of a present value of a termination claim of the OWLS contract or the full liquidating dividend less payment to the DIVS contract, and the database stores an adjusted OWLS contract.

The corporate event is a partial liquidating dividend and the derivative contract is a DIVS contract. In accordance with an exemplary embodiment of the claimed invention, the processor adjusts the value of the DIVS contract to a present value of a remaining stream of dividends expected on the underlying security which will no longer be paid due to the partial liquidating dividend by said processor, and the database stores an adjusted value of the DIVS contract. In accordance with an exemplary aspect of the claimed invention, the derivative contract is an OWLS contract, and the processor adjusts the terms of the OWLS contract to receive a payment that is the lesser of a present value of a termination claim of the OWLS contract or the partial liquidating dividend less payment to the DIVS contract, and the database stores the adjusted OWLS contract. In accordance with another exemplary aspect of the claimed invention, the processor adjusts the termination claim based on a future value of the partial liquidating dividend paid to the OWLS contract, and the database stores the adjusted termination claim.

The corporate event is a special dividend and the derivative contract is a DIVS contract. In accordance with an exemplary embodiment of the claimed invention, the processor adjusts the value of the DIVS contract to receive a specified percentage of the special dividend and adjusts the termination claim based on a future value of the special dividend less any distribution made to the DIVS contract. The database stores the adjusted termination claim and the adjusted value of the DIVS contract. In accordance with an exemplary aspect of the claimed invention, the derivative contract is an OWLS contract, and the processor adjusts the term of the OWLS contract to receive a payment that is the lesser of a present value of a termination claim of the OWLS contract or the special dividend less payment to the DIVS contract. The database stores the adjusted OWLS contract.

Various other objects, advantages, and features of the claimed invention will become readily apparent from the ensuing detailed description, and the novel features will be particularly pointed out in the appended claims.

BRIEF DESCRIPTION OF THE FIGURES

The following detailed description, given by way of example, and not intended to limit the claimed invention solely thereto, will best be understood in conjunction with the accompanying drawings in which:

DETAILED DESCRIPTION OF THE EMBODIMENTS

Figure 1:
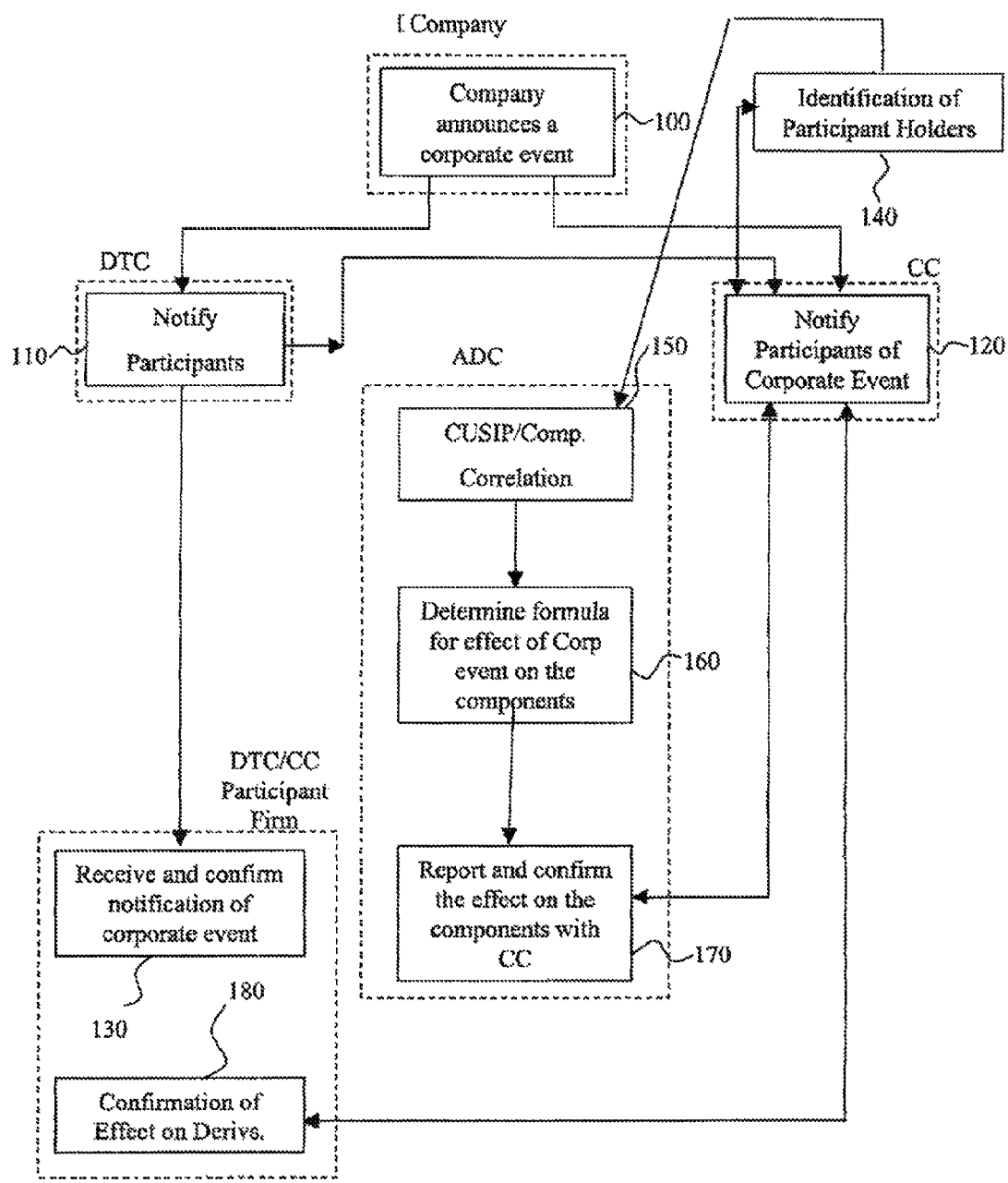
FIG. 1 is a flow chart illustrating the activities undertaken upon the announcement of a corporate event.

Before referring to the drawings in detail, it will be understood that for the purposes of this invention, the terms derivatives, derivative securities, derivative security contracts, derivative contracts, and futures contracts may all be used interchangeably. Also, it will be understood that for the purposes of this invention, the terms exercise price and termination claim may be used interchangeably. It will also be understood that while the examples herein disclose contracts having a five year time period and settling in stock with European style expiration, the claimed invention will apply to contracts of longer or shorter time and can settle in stock or cash and have European or American style expiration. It will also be understood that the term derivatives or derivative contracts can be used to describe the scenario where the derivative contract is based on more than a share or unit of the underlying security. The underlying security can be any security that trades in an exchange or electronic exchange, such as New York Stock Exchange (NYSE), National Association of Securities Dealers Automated Quotations Systems (NASDAQ), etc. It is appreciated that the security includes but is not limited to a common stock, a preferred stock, an index, an exchange-traded fund (ETFs), a family of ETFs or a spider, bonds, commodities, etc. The term "share" and "unit" are used interchangeably herein depending on the type of the security.

According to an embodiment of the claimed invention, upon the occurrence of a corporate event, several financial organizations coordinate the notification of the event to the appropriate parties, the processing, and valuation of the derivative securities at issue, and the reporting of such valuations. These financial organizations include Depository Trust Corporation ("DTC"), a Clearing Corporation ("CC"), and Americus Derivatives Corporation ("ADC"). They accomplish these tasks in two series of events, one taking place on the date that the corporate event is announced, and the other taking place on the actual date that the corporate event takes effect.

As illustrated in FIG. 1, a company initiates the whole process by announcing a corporate event in step 100. The company notifies participant members of DTC, which, on behalf of participant members, may serve as the repository for the company's equity, in step 110. DTC then notifies (i) CC, which maintains records that identify all member firm holders of the relevant derivative securities, in step 120; and (ii) DTC/CC participant firm, which can identify customer holdings, reconcile such holdings to ADC, and notify customers and the company of relevant information, in step 130. As set forth in commonly owned U.S. Pat. Nos. 5,671,358 and 5,758,097, the claimed invention can be implemented using computers at the DTC, ADC, CC and DTC/CC participant firm. The company's computer communicates with the DTC's computer to announce the corporate event in step 100. As it learns of the corporate event, the DTC's computer disseminates this information to its participants in step 110. The DTC's computer then notifies the CC's computer and DTC/CC participant firm's computer in step 120. The DTC/CC participant's computer identifies customer holdings, reconciles such holdings to ADC's computer, and notifies customers and the company computers of relevant information in step 130.

ADC requests from CC, information that identifies member firm holders of record of the derivative contracts pertinent to a derivative contract valuation, and CC responds with the pertinent information in step 140. That is, the ADC's computer sends a request to the CC's computer for information identifying member firm holders of record of the derivative contracts pertinent to a derivative contract valuation, and CC's computer responds with the pertinent information in step 140. ADC then performs three tasks in order to establish the valuation of the various derivative contracts for the eligible holders of such derivative contracts:

1. The CUSIP correlation computer means of the ADC's computer performs a Committee on Uniform Securities Identification Procedures ("CUSIP") correlation for correlating the equity at issue with the various derivative contracts related to such equity, such as dividend value of stock (DIVS®), option with limited stock (OWLS®) and residual interest in stock (RISKS®), using the CUSIP data from a CUSIP file or memory storage means in step 150;
2. The ADC's computer determines any needed formulas for calculating the effect of the corporate event on the various derivative contracts in step 160; and
3. The ADC's computer reports and confirms the effect on the derivative contracts with the CC's computer in step 170.

The CC's computer then reports and confirms the effect on the derivative contracts with DTC/CC participant firm's computer in step 180.

Figure 2:
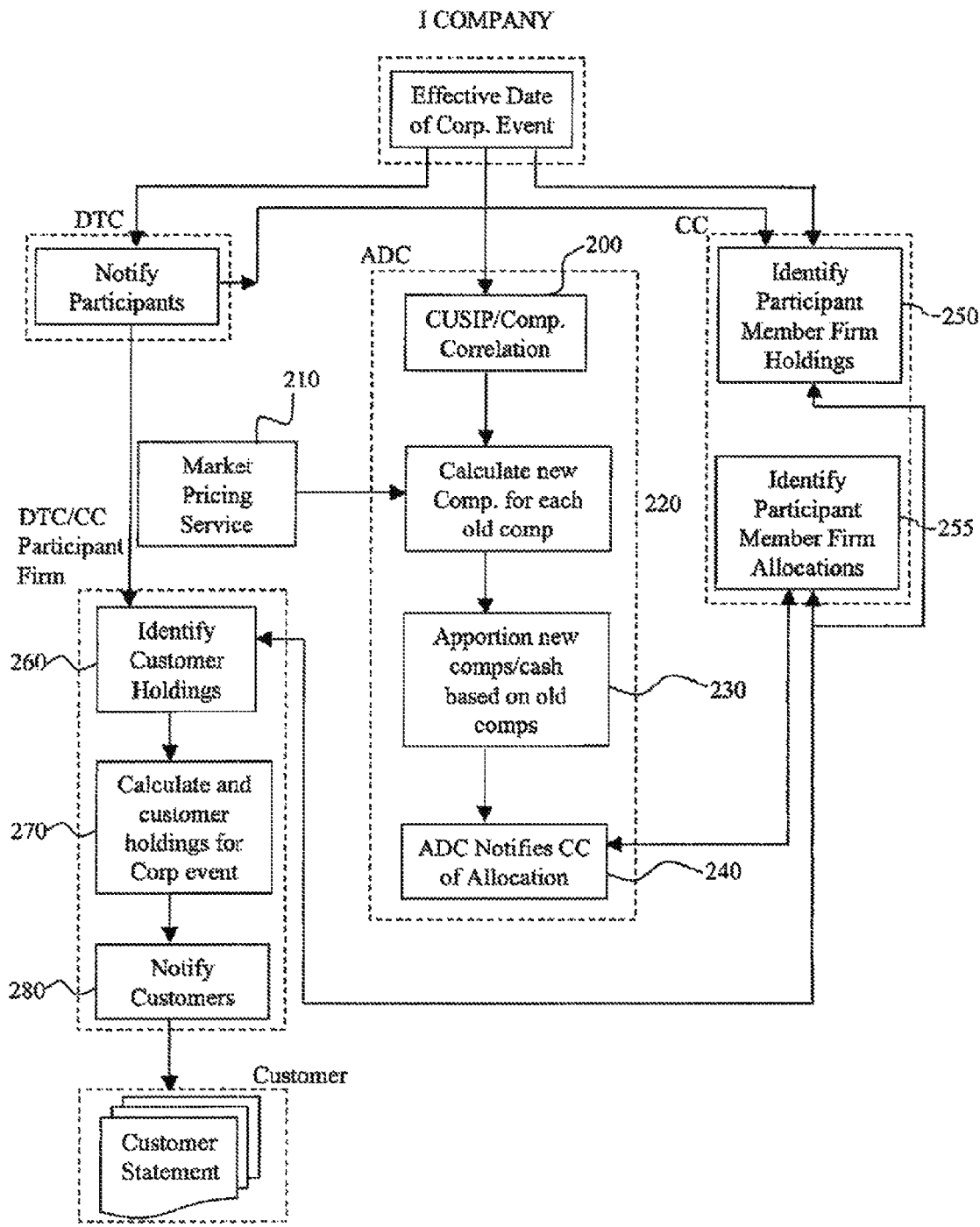
FIG. 2 is a flow chart illustrating the activities on the effective day of the corporate event.

The second part of this process is executed on the effective date of the corporate event as illustrated in FIG. 2. On the effective date, the CUSIP correlation computer means of the ADC's computer performs a CUSIP correlation computation using the CUSIP data from a CUSIP file or memory storage means (e.g., database and other comparable computer storage device), correlating the equity at issue with the relevant derivative contracts in step 200. The ADC's computer then receives pricing information from a Market Pricing Service computer in step 210, and uses that pricing information along with the formulas previously determined in step 160 (FIG. 1) to compute and store new time adjusted values for the relevant derivative contracts in a computer file, storage disk or database in step 220. It is hereby appreciated that the pricing information used in computing new time adjusted values may be the market price of one of the derivative contract based on the underlying security on the effective date of the corporate event, or an average of the market price over a specified period of time prior to the effective date of the corporate event, or any other predetermined price or pricing formula. The vote apportioning computer means of the ADC's computer then allocates and stores values to the relevant derivative contracts based on the time adjusted valuations in the computer file, storage disk or database in step 230. The ADC's computer notifies the CC's computer of the adjusted valuations in step 240, where the CC's computer adjusts the positions of its member firms to reflect the adjustments made by the ADC's computer. The CC's computer then transmits this adjustment information to the member firms' computer in steps 250 and 255, who then identify customer holdings in step 260, adjust the customer holdings accordingly in step 270, and notify the customers through a customer statement in step 280.

The claimed invention relates to the process undertaken by ADC in the above examples, or similar financial organizations, in adjusting the effected derivative contracts upon the occurrence of a corporate event. The claimed invention provides ADC, or any like organization which processes derivative contracts, a process for computing the adjustments to such derivative contracts, which factors in the time value of money.

Figure 3:
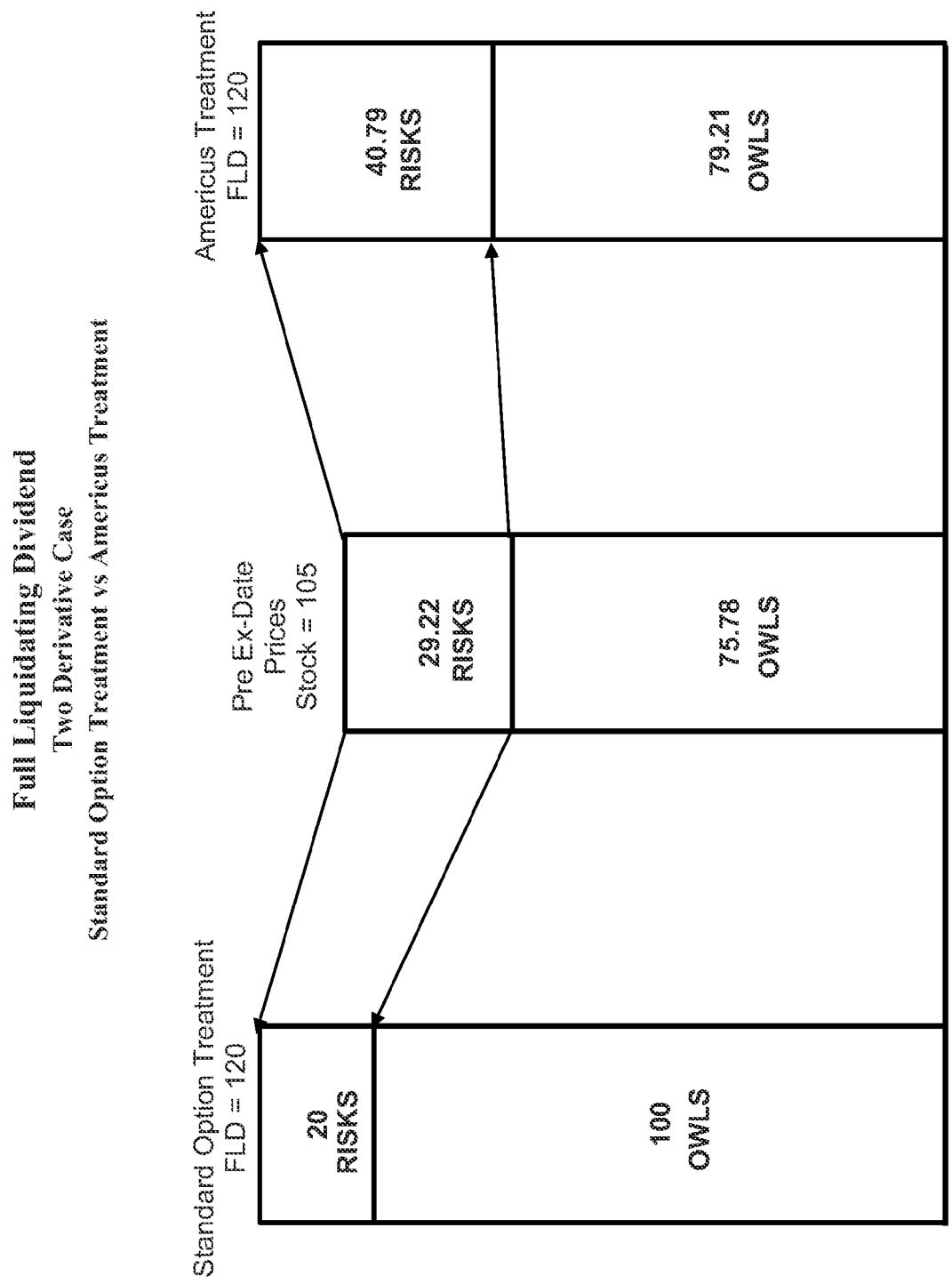
FIG. 3 is a chart illustrating an exemplary embodiment of the inventive process which allocates funds to the OWLS and RISKS contracts of a security upon a corporate event triggering a full liquidation.

In accordance with an exemplary embodiment of the claimed invention as illustrated in FIG. 3 and Table 1, the derivative contract comprises an American Style call option on a 100 shares of common voting stock in a blue chip corporation (XYZ) with a five (5) year fixed time period, which will be assumed to equate to 1825 days for the purposes of the calculations for this example. The holder of the option can exercise or call the option at any time during this time period. The holder paid $29.22 per share for this option with a strike price of $100, meaning that the investor can purchase the 100 shares of XYZ at the price of $100 per share at any time during the allotted five year time period. One (1) year or 365 days into the allotted five (5) year time period, company ABC announces they are fully liquidating the company, paying the shareholders $120 for each share of stock they own.

TABLE 1

FULL LIQUIDATING DIVIDEND
(Company ABC trading in RISKS and OWLS only)

Assumed Stock Parameters

| | | | |
|---|---|---|---|
| Dividend | $0.00 | Stock Price | $105.00 |
| Days to Term | 1460 | CALLS (RISKS) Price | 29.22 |
| Years to Term | 4 | Covered WRITES (OWLS) Price | 75.78 |
| Termination Claim | $100.00 | | |
| Standard Deviation | 16% | | |
| Risk Free Rate | 6% | | |

Standard option treatment

1. The Termination Claim is not adjusted.
2. Payment to the Covered Writes is the lesser of the TC or the liquidating dividend.
3. The CALLS receive any money left after the Covered Writes are paid.

Claimed Invention: Americus derivative treatment

1. The Termination Claim is adjusted by taking the present value of the original TC discounted at the risk free rate the termination date to the present.
2. Payment to the Covered Writes (OWLS) is the lesser of the adjusted TC or the liquidating dividend.
3. The CALLS (RISKs) receives any money left after the Covered Writes (OWLS) are paid

| | | |
|---|---|---|
| Adj. Term Claim | 79.21 | PV of the Termination Claim discounted at the risk free rate 79.21 = 100/[(1 + .06)^4] |

CALL option (RISKS) price comparison
For a Full Liquidating Dividend

| | Initial Price | Standard Option Treatment (CALLS) | Americus Treatment (RISKS) |
|---|---|---|---|
| CALL Option (RISKS) | $29.22 | $20.00 | $40.70 |

TABLE 1-continued

FULL LIQUIDATING DIVIDEND
(Company ABC trading in RISKS and OWLS only)

| Price Change | −9.22 | 11.57 |
|---|---|---|
| Percent Change | −31.56% | 39.58% |

According to the current known process for the handling of options in a full liquidation scenario, the option holder would exercise his option, purchasing the stock at $100 and then immediately selling that stock for $120. The option holder would realize a loss of $9.22 per share, or $922 for the 100 shares, as he would gain $20 per share in proceeds after paying $29.22 per share for the call option. This example illustrates the problem existing in the current treatment of derivative contracts. The option holder paid the $29.22 per share in order to speculate on the underlying stock over a five (5) year period. Unfortunately for the option holder, a corporate event has curtailed this period of speculation by four (4) years or 1,460 days. The option holder has not received the true benefit of his bargain.

The claimed invention changes the process of distribution in such a scenario to factor in the value of the remaining time period. In accordance with an exemplary embodiment of the claimed invention as illustrated in FIG. 3 and Table 1, the exercise or strike price of the ABC option is discounted to provide the option holder with a distribution that reflects the value of the 1,460 lost days of speculation. Any discounting formula may be used to factor in the 1,460 lost days. In Table 1, the strike price is discounted with the following formula:

$$S=E/(1+r)^y$$

S is the new discounted strike price; for the purposes of this example assume that E, the original strike price, is $100, and r, the risk free rate of interest, is 6%, and y, the remaining period of time on the option contract, is 1460/365 or 4. According to this discount formula the new strike price, $S=100/(1.06)^4=\$79.21$. According to the readjusted strike price, S, the option holder now gains proceeds equal to the difference between $120 and $79.21, or $40.79 per share, which is $20.79 per share more than the proceeds obtained using the standard treatment of options. These proceeds result in a profit of $40.79-$29.22 per share, or $11.57 per share, or $1,157 for the 100 shares. The inventive treatment of this derivative contract provides the option holder with a return on his investment of 39.58% as opposed to the 31.5% loss of capital experienced with the standard derivative treatment. While the holder of the call option realizes more profit, the writer or seller of the option receives less money for his shares of ABC stock. The option writer or seller now only receives $79.21 per share of ABC stock, which is $20.79 less than the amount he would have received using the standard treatment of option contracts in this scenario. Assuming that the risk free rate of interest is 6%, the option writer or seller, however, could invest his money in short term treasury bonds with the same risk free rate and recoup the full $100 in 1460 days, which is the remaining term of the option contract.

Figure 4:
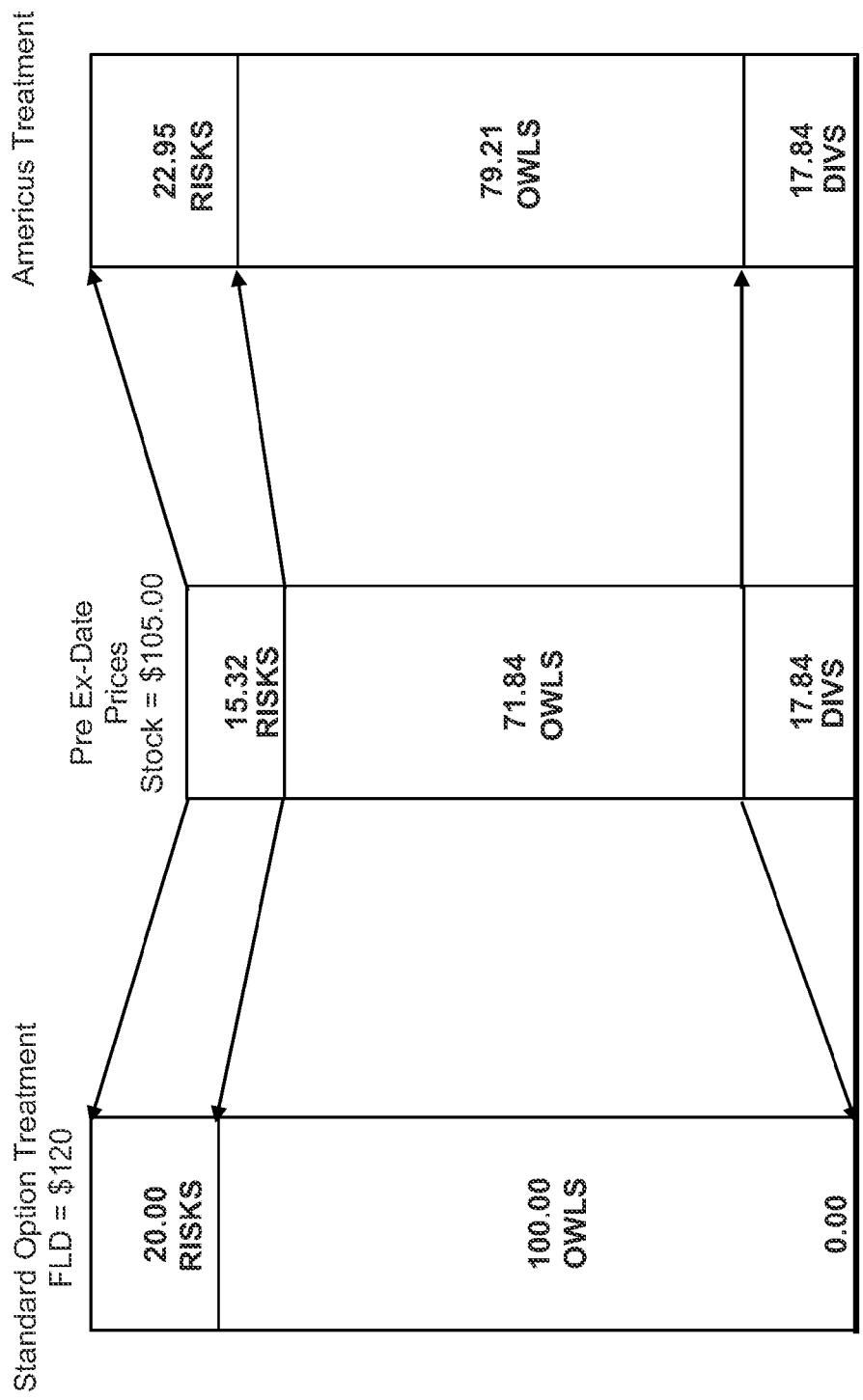
FIG. 4 is a chart illustrating an exemplary embodiment of the inventive process which allocates funds to the DIVS, OWLS and RISKS contracts of a security upon a corporate event triggering a full liquidation.

In accordance with an exemplary embodiment of the claimed invention as illustrated in FIG. 4 and Table 2, the inventive method is applied to a different type of derivative contract. The adjustable derivative contracts are based on the underlying common stock of XYZ corporation, specifically each derivative contract is based on one of the economic interests of two or more shares of the underlying common stock of XYZ corporation. In accordance with an exemplary aspect of the claimed invention, the value of the underlying security is divided and allocated to three adjustable derivative contracts: (1) the adjustable DIVS contract represents the stream of dividends distributed to the holders of each share of XYZ stock; (2) the adjustable RISKS contract represents the speculation on future gains on the value of each share of XYZ stock, which is similar, but not identical, to a call option on XYZ stock; and (3) the adjustable OWLS contract represents the nucleus of a share of XYZ stock, absent the dividend and speculative aspects of that stock, which is similar, but not identical to holding XYZ stock after writing a call option on the dividends and a call option on that stock above a termination claim. Strictly speaking, the adjustable OWLS contract is similar to holding the stock and writing calls on the appreciation and the dividend. It is appreciated that all adjustable OWLS and RISKS contracts can be settled in cash or securities depending on the derivative contract. The concepts and terminology associated with these three derivative contracts based on an underlying stock are fully set forth in commonly owned U.S. Pat. Nos. 5,671,358 and 5,758,097, which are incorporated by reference herein in their entirety.

In accordance with this exemplary embodiment of the claimed invention, investors may purchase one or more of the three adjustable derivative contracts, each adjustable derivative contract being based on one of the three economic interests of a security, as European Style, five (5) year derivative contracts, meaning that the derivative contract would have a five year term and it can only be exercised at the end of this 5 year period. The three adjustable derivative contracts based on three different economic interests of two or more shares/units of a security, respectively, may not be exercised during the 5 year period, but may be freely traded throughout that time period. It is anticipated that the value of three adjustable derivate contracts combined, each based on one of the three economic interests of the underlying security, will closely approximate the market price of the underlying security at any time.

The writer of the adjustable DIVS contract would pay the holder of this derivative contract the dividends that are distributed on the underlying security throughout the 5 year period. The value and price of this derivative will approach zero (0) by the end of the 5 year term. The price of the adjustable DIVS derivative contract is always based on the expected remaining nominal dividend distribution for the XYZ stock for that 5 year term.

The writer of the adjustable RISKS contract would deliver to the holder of this derivative contract, at the end of the 5 year term, stock or cash worth the amount that the price of XYZ stock at the time is above the termination claim, which is similar but not identical to a strike price. This would represent a settlement of differences between the termination claim and the current market price of the stock at termination. The adjustable RISKS contract would state whether the settlement of the differences is paid in cash or securities. If at the end of 5 years, shares of XYZ are trading at or below the termination claim, then the holder of the adjustable RISKS contract receives nothing. If, however, the price of XYZ stock is trading above the termination claim at the end of the five year period, the holder of the adjustable RISKS contract receives the difference between the market price of XYZ stock and the termination claim. The termination claim is set at the beginning of the 5 year period, and the adjustable RISKS contract is priced accordingly. During the five year period, the adjustable RISKS contract can be priced similar to a call option.

The adjustable OWLS contract is what remains of a share of XYZ stock after the adjustable DIVS contract and adjustable RISKS contract have been removed. The holder of this derivative contract at the end of the 5 year period receives the price of the underlying XYZ share up to the termination claim. If the market price of XYZ shares at the end of the 5 year period is equal to or greater than the termination claim, then the holder of the OWLS contract is paid an amount equal to the termination claim, paid in either underlying security or cash pursuant to the terms of the derivative contract. If XYZ's market price is below the termination claim at the end of the 5 year period, then the holder of the adjustable OWLS contract receives the value of the full price of the stock in either underlying security or cash pursuant to the terms of the derivative contract.

It is appreciated that the value of the common stock can be further divided into four (4) or more adjustable derivative contracts. For example, in addition to the adjustable RISKS and DIVS, the OWLS contracts can be further subdivided into levels of appreciation with different termination claims. The adjustable OWLS contract described above can be subdivided into adjustable OWLS1 contract with a termination claim of $50, adjustable OWLS2 contract with a termination claim of $75, and adjustable OWLS3 contract with a termination claim of $100. Once the 5 year period is over, the holders of (i) adjustable OWLS1 contract would receive the market price of XYZ up to the $50 termination claim; (ii) adjustable OWLS2 contract would receive any appreciation of XYZ common stock over $50 up to the $75 termination claim; and (iii) adjustable OWLS3 contract would receive any appreciation of XYZ common stock over $75 up to the $100 termination claim. The market would price these derivative contracts according to the relative risk of the derivative contract with the adjustable OWLS1 contract being the least risky of the three adjustable OWLS contracts and the adjustable OWLS3 contract being the most risky of the three adjustable OWLS contracts. The concepts described herein for the three adjustable derivative contracts, each based on one of the economic interests of the underlying security, can just as easily be applied to four or more adjustable derivative contracts.

A corporate event, such as the sale of XYZ, triggers a full liquidating dividend of XYZ shares prior to the expiration of the 5 year period for the holders of the adjustable DIVS, RISKS, and OWLS contracts. The sale occurs 365 days into the 5 year term (assuming 365 days in a year for simplicity of calculations) leaving 1460 days (4.0 years) on the term of the adjustable DIVS, RISKS, and OWLS contracts. For the purposes of this example, assume that the termination claim (TC) was set at $100, the risk free rate, r, is 6.00%, and the annual dividend is $5. Under a standard-like option treatment, the DIVS contract holders would receive nothing from such a distribution. Additionally, the RISKS contract holders would not get the benefit of the full five year period to allow the stock to appreciate as they had anticipated. The OWLS contract holders would benefit unfairly as they would receive the full benefit of their bargain without having to wait the full 5 year term. If the liquidating dividend was $120, the three adjustable derivative contracts would receive the following distributions: DIVS contract holders would receive $0, RISKS contract holders would receive $20, and the OWLS contract holders would receive $100. That is, the termination claim is not adjusted to reflect the lost period of time for the adjustable RISKS contract holders and the adjustable DIVS contract holders simple lose their stream of income.

In accordance with an exemplary embodiment of the claimed invention as illustrated in FIG. 4 and Table 2, a full liquidating dividend would result in the following distributions that account for the time value of money: first, the adjustable DIVS contract holder would receive the present value of the remaining expected nominal dividend payments, which, for this example, is equal to $17.84. Second, the termination claim is discounted to represent its present value considering that there are 4.0 years remaining on the term of the derivatives. Using the 6.00% risk free rate, the original TC of $100 is reset to its present value of $79.21. Accordingly, holders of the adjustable OWLS contract receive $79.21 per share. Finally, the holders of the adjustable RISKS contract receive all of the remaining distribution, which for this example is $22.95 per share. That is, the claimed invention adjusts one or more exemplary terms of the derivative contract but not limited to the following: the termination claim, the settlement or termination date, the underlying securities, the distribution or payment.

TABLE 2

FULL LIQUIDATING DIVIDEND
(Company XYZ trading in OWLS, RISKS and DIVS)

Assumed Stock Parameters and Derivative Contract Prices

| | | | |
|---|---|---|---|
| Dividend | $5.00 | Stock Price | $105.00 |
| Days to Term | 1460 | RISKS Price | 15.32 |
| Years to Term | 4 | OWLS Price | 71.84 |
| Termination Claim | $100.00 | DIVS Price (b) | 17.84 |
| Standard Deviation | 16% | | |
| Risk Free Rate (a) | 6% | | |

(a) The interest rate on Treasury obligations matched to the RISKS termination date.
(b) Based on the risk free rate and assuming no dividend growth
 1. The DIVS receives the present value of the remaining nominal dividends discounting at the risk free rate.
 2. The Termination Claim is adjusted by taking the present value of the original TC discounted at the risk free rate.
 3. Payment to the OWLS is the lesser of the adjusted TC or the liquidating dividend reduced by the amount paid to the DIVS.
 4. The RISKS receives any money left after the OWLS and DIVS are paid.

| | | | | |
|---|---|---|---|---|
| DIVS Payment | $17.84 | Present Value of the expected future dividends discounted at the risk free rate | | |
| Adjusted Term Claim | $79.21 | PV of the Termination Claim discounted at the risk free rate $79.21 = 100/[(1 + .06)^4]$ | | |
| Liquidating Dividend | $120.00 | $130.00 | $140.00 | $150.00 |
| Value of DIVS | 17.84 | 17.84 | 17.84 | 17.84 |
| Liq Div less DIVS | 102.16 | 112.16 | 122.16 | 132.16 |
| Value of OWLS | 79.21 | 79.21 | 79.21 | 79.21 |
| Value of RISKS | 22.95 | 32.95 | 42.95 | 52.95 |

Figure 5:
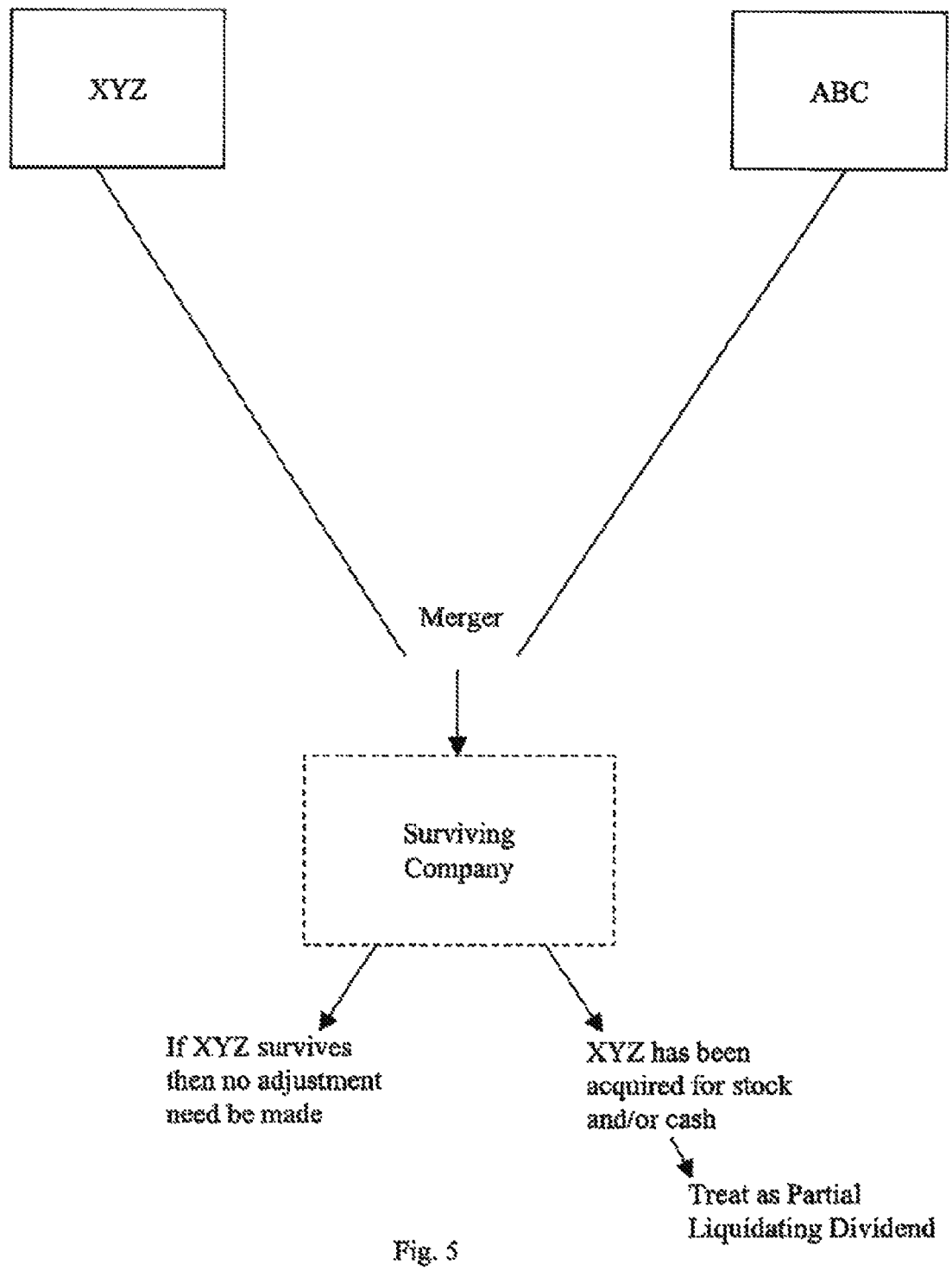
FIG. 5 is a chart illustrating an exemplary embodiment of the inventive process which allocates funds to the different derivative contracts of a security upon a corporate event triggering a merger.

In accordance with an exemplary embodiment of the claimed invention as illustrated in FIG. 5 and Table 3, XYZ corporation participates in a merger with ABC corporation. If XYZ is the surviving corporation, then no distributions are made and no adjustments need to be made to the adjustable derivative contracts based on the stock of XYZ corporation. If the XYZ is not the surviving company, then a few options arise. One example is that no distributions are made, and the surviving company's stock simply replaces the common stock as the underlying assets for the adjustable derivative contracts. Another example involves the acquisition of XYZ for stock and cash. For this latter example, the adjustable derivative contracts will be adjusted as for a partial liquidating dividend as discussed in relation to Table 5 herein, with the remaining stock underlying the adjustable DIVS, OWLS and RISKS contracts until the end of the contract period, i.e., 5 years.

TABLE 3

MERGERS
(Company XYZ trading in OWLS, RISKS and DIVS)

1. If the surviving company is the issuer of the derivative contracts, no adjustments for the DIVS, OWLS and RISKS will be made.
2. If the issuer is not the surviving company, the stock of the acquiring company will underlie the derivative contracts.
3. If the original company is acquired for stock and cash, the derivative contracts will be adjusted as for a partial liquidating dividend for the cash portion.
4. The DIVS holder will receive the dividends paid by the company after the merger.

In accordance with an exemplary embodiment of the claimed invention as illustrated in Table 4, XYZ issues a special dividend, which is not part of the stream of dividends anticipated by the holders of XYZ common stock. XYZ, whose shares at the time are trading on the market at $105/share, issues a special dividend of $10.00 with 1460 days remaining in the term of the derivative contracts.

TABLE 4

SPECIAL DIVIDEND
(Company XYZ trading in OWLS, RISKS and DIVS)

1. The DIVS receives a portion of any special dividend representing up to 3% of the underlying stock price, or a percentage specified in the contract, of the stock's price on the ex-date of the special dividend. This payment may be reduced to reflect the time left in the contract.
2. The OWLS receives any remaining portion of the special dividend.
3. The value of the special dividend, reduced by the payment to the DIVS, is adjusted to be its future value discounted at the risk free rate.
4. The Termination Claim is reduced by the future value from 3.

| | | |
|---|---|---|
| Special Dividend | $10.00 | |
| DIVS Payment | $3.15 | Based on the amount of the special dividend and 3.0% of the stock's price<br>3.15 = 105 * .030 |
| Payment to OWLS | $6.85 | Portion of the special dividend payable to OWLS<br>6.85 = 10.00 − 3.15 |
| Future Value of Dividend | $8.65 | Future Value of the SD, reduced by the DIVS payment, discounted by the risk free rate<br>$8.65 = (10.00 − 3.15) * (1 + 0.06)^{(1460/365)}$ |
| Adjusted Term Claim | $91.35 | Term Claim reduced by the future value of the special dividend. This value is used to determine the payout to the OWLS and RISKS on the termination date<br>91.35 = 100.00 − 8.65 |

| Expected Ex-date Values as the Result of a Special Dividend | | |
|---|---|---|
| Stock | $95.00 | Stock price reduced by the special dividend |
| RISKS | 12.72 | Calculated (Black & Scholes) using $95 stock price, 91.35 adjusted Termination Claim and $5.00 dividend |
| DIVS | 17.84 | PV of 4 years of nominal dividends ($5.00) discounted at the risk free rate |
| OWLS | 64.44 | Residual value based on the new stock, RISKS and DIVS |
| OWLS IRR | 9.12% | OWLS IRR going from 64.44 to 91.35 in 1460 days |

Again, one possible treatment of special dividends would result in the following distributions: the adjustable DIVS and RISKS contract holders would receive $0 from this distribution, the adjustable OWLS contract holders would receive the full $10/share, and the termination claim would remain unchanged. In alternative treatments, the adjustable DIVS contract holder receives the entire special dividend; or the adjustable DIVS and OWLS contract holders, each receives a portion of the special dividend based on a predetermined formula.

In accordance with an exemplary embodiment of the claimed invention, each derivative contract is based on 2 or more shares/units of the underlying security. In the following example the prices below are per underlying share/unit per contract.

In accordance with an exemplary embodiment of the claimed invention as illustrated in Table 4, the distributions are made to the adjustable derivative contract holders in the context of the time value of money. Assume for the purposes of this example that the termination claim was set at $100, the adjustable OWLS contract is currently trading at $71.84. The adjustable DIVS contract holder receives the portion of the special dividend representing a specified percentage of the current market price of the underlying equity security up to the amount of the special dividend. This percentage may be determined by several methods, including, but not limited to the following: ADC may set the percentage prior to the issuance of the adjustable DIVS contract; ADC may set it upon the issuance of the special dividend; a special committee within the clearing corporation may be in charge of setting it; it may be the function of another variable such as the risk free rate of return; it may be standardized by the financial industry. In this example, assume that the adjustable DIVS contract receive a distribution from the special dividend up to 3% of the stock's price, which in this case is $105*0.03 or $3.15. If the special dividend is less than 3% of the stock's price, then only the adjustable DIVS contract holder participates in the distribution and no other adjustments need be made. In this example, the special dividend is $10.00, so the adjustable DIVS contract holder gets a $3.15/share distribution, and there remains $6.85 to be distributed. The adjustable OWLS contract holder receives the remainder of the special dividend, in this case $6.85. The termination claim would then be adjusted to reflect the current $6.85 distribution to the adjustable OWLS contract holders. The termination claim can be adjusted by reducing it by the future value of the $6.85 distribution using the 6.0% risk free rate for the adjustable OWLS contract, which equals $6.85*(1+0.06)^{4.0} or $8.65. The termination claim is reduced to $100-$8.65 or $91.35 to fairly reflect the future value of the current distribution to the adjustable OWLS contract holders, which acts like an early withdrawal of their initial investment for the adjustable OWLS contract holders. The adjustable RISKS contract holders are no longer penalized upon XYZ's distribution of special dividends, allowing them to recoup the loss of capital to the corporation, which is likely to be reflected in a lower stock price, through a properly reduced termination claim.

In accordance with an exemplary embodiment of the claimed invention as illustrated in Table 5, XYZ corporation issues a partial liquidating dividend (PLD). First, the adjustable DIVS contract holders will receive the present value of any reduction in the dividends paid on the underlying stock. The PLD will then be adjusted by deducting any payments to the adjustable DIVS contract holders. The adjusted PLD will be denoted as $PLD_n$. Then the present value of the termination claim (TC) is compared to the $PLD_n$. If the present value of the TC is greater than the $PLD_n$, then (i) the TC is adjusted by deducting from it the future value of the $PLD_n$, which is based on the potential IRR of the current market price of the adjustable OWLS contract needed to reach the TC upon expiration of the derivative; and (ii) the adjustable OWLS contract holders are paid the full $PLD_n$. If, however, the $PLD_n$ is greater than or equal to the present value of the termination claim, then (i) the adjustable OWLS contract holders get paid the present value of the termination claim, meaning that they have been paid on their investment and no longer have an interest in the underlying asset; (ii) the termination claim is adjusted to zero; (iii) the adjustable RISKS contract holders get paid the remainder of the $PLD_n$, which is the $PLD_n$ reduced by the present value of the TC; and (iv) any future liquidating dividends are paid to the adjustable RISKS and DIVS contract holders.

In accordance with an exemplary embodiment of the claimed invention as illustrated in Table 5, with 1460 days (4.0 years) left in the term of the adjustable derivative contracts, XYZ issues a PLD of $40.00. The annual dividend was decreased from $5 to $3.50. As in previous embodiments, the TC is $100 and the risk free rate of return is 6.00%. Under one possible distribution, the adjustable DIVS and RISKS contract holders would have received $0 while the adjustable OWLS contract holders would have received the full $40/share and the termination claim would have been reduced by $40 (TC=$100−$40=$60).

In accordance with an exemplary embodiment of the claimed invention as illustrated in Table 5, the PLD would have resulted in the following distributions and adjustments to the adjustable derivative contracts. First, the adjustable DIVS contract holders would have received a payment of $5.35 per share, which is the present value of the $1.50 loss in the annual dividend for the next 4.0 years, to make up for the decrease in dividend payments resulting from this PLD. The PLD is then adjusted via a reduction of $5.35, leaving a $PLD_n$ of $34.65. This value is then be compared with the present value of the TC, which is equal to $100/(1.06)^{4.0}$ or $79.21. As the present value of the TC of $79.21 is greater than the $PLD_n$ of $34.65, the adjustable OWLS contract holders receive the full adjusted partial liquidation distribution of $34.65 per share of stock underlying the OWLS contract. In addition, the TC must be adjusted by a deduction of the future value of the $PLD_n$ discounted by the risk free rate of 6.0%. The future value of the $PLD_n$ is equal to $34.65*(1.06)^{4.0}$ or $43.74, and the adjusted TC should now be $56.26. Hence, at the end of the five year period, if the stock price is trading at any price

TABLE 5

PARTIAL LIQUIDATING DIVIDEND
(Company XYZ trading in OWLS, RISKS and DIVS)

1. DIVS will receive the present value of the reduction, if any, in the dividend paid on the underlying stock.
2. Adjusted PLD (PLDn) = PLD reduced by the payment to the DIVS
3. If the PLDn is less than the present value of the Termination Claim
   i.   Adj. TC equals the original TC reduced by the future value of the PLDn discounted at the risk free rate.
   ii.  The OWLS are paid the adjusted PLD.
4. If the PLDn is greater than or equal to the present value of the termination claim.
   i.   The OWLS get paid the present value of the termination claim (PV(TC)).
   ii.  The Termination Claim is adjusted to zero.
   iii. The RISKS get the remaining portion of the adjusted PLD (PLDn − PV(TC)).
   iv.  Any future liquidating dividends will be paid to the RISKS and DIVS, the OWLS having been completely paid.

| | | |
|---|---|---|
| Value of PLD | $40.00 | |
| New Stock Dividend | $3.50 | Announced by the company |
| Reduction in Dividend | $1.50 | 1.50 = 5.00 − 3.50, the reduction in the annual dividend due to the PLD |
| Payment to DIVS | $5.35 | 5.35 = PV of 1.50 for 4 years discounted at 6.0% |
| Adjusted PLD | $34.65 | Portion of PLD due to the OWLS 34.65 = 40.00 − 5.35 |
| FV of Adjusted PLD | $43.74 | Future value of the PLD discounted at the risk free rate. 43.74 = 34.65 * [1 + .06 ^ (1460/365)] |
| Adjusted Term Claim | $56.26 | Termination Claim reduced by the future value of the PLD. This value is used to determine the payout to the RISKS and OWLS at the termination date. 56.26 = 100 − 43.74 |

Expected Ex-date Values as a Result of a Partial Liquidating Dividend

| | | |
|---|---|---|
| Stock | $65.00 | Pre ex-date stock price reduced by the amount of the PLD |
| RISKS | $11.13 | Black & Scholes RISKS price using $65.00 stock price, $56.26 adjusted Termination Claim and the $3.50 new dividend |
| DIVS | $12.49 | PV of 4 years of $3.50 annual nominal dividends discounted at the risk free rate |
| OWLS | $41.38 | New residual value of the OWLS 41.38 = 65.00 − (11.13 + 12.49) |
| OWLS IRR | 7.98% | OWLS IRR going from 41.38 to 56.26 in 4 years | above $56.26, that excess will belong to the adjustable RISKS contract holders while the adjustable OWLS contract holders would only receive $56.26 per share at that time, in addition to their current $34.65 distribution.

In accordance with an exemplary embodiment of the claimed invention as illustrated in Table 6, XYZ spins-off another company ABC. Upon such an occurrence, the adjustable derivatives are now backed by a combination of both XYZ and ABC shares. XYZ shares have been spun-off so that there is a ¼ share of ABC for every share of XYZ. Accordingly an adjustable derivative contract backed by 100 shares of XYZ is now backed by 100 shares of XYZ and 25 shares of ABC. After the spin-off, the XYZ shares trade at a market price of $87.50 while the ABC shares trade at a market price of $50. Relative to overall dollar value, the derivatives are now backed by 87.5% XYZ shares, (100 shares*$87.50)/(100 shares*$87.50+25 shares*$50), and 12.5% ABC shares, (25 shares*$50)/(100 shares*$87.50+25 shares*$50).

TABLE 6

SPIN-OFFS AND SPLIT-UPS
(Company XYZ trading in OWLS, RISKS and DIVS)

1. The RISKS, OWLS and DIVS contracts will be backed by the shares of the original company and the shares of the spun-off company.
2. Assuming each original contract were for 100 shares, the adjusted contract will be for 100 shares of the spinning company and 100 times the number of pro rata shares of the spun-off company.
3. The DIVS will receive the dividend paid on the new companies' times the number of shares of each distributed per contract.
4. At termination the value of the underlying shares will be computed as the price of each times the number of shares of each per contract.
5. The dollar value of stock each derivative contract receives will be calculated as in a normal termination, based on the termination claim and the combined value calculated in 4. RISKS receive nothing if the combined value from 4 is below the TC.
6. The number of shares of each company the OWLS and RISKS receive will be the percentage value that each derivative contract represents of the combined value from 5, times the number of shares each company represents in the contract.

|  | Original | Post Spin-off | | Assume 1/4 share of company 2 for |
|---|---|---|---|---|
|  | Company | Co. 1 | Co. 2 | each original share and the TC is $100 |
| On Effective Date: | | | | |
| Shares/contract | 100 | 100 | 25 | |
| Price/share | $100.00 | $87.50 | $50.00 | 100 = 1.00 * 87.5 + .25 * 50.0 |
| Value/contract | $10,000 | $8,750 | $1,250 | share price times shares/contract |
| Relative value | 100.00% | 87.50% | 12.50% | The fraction that each company represents of the original company |
| Dividend/share | $5.00 | $4.00 | $4.00 | Announced by companies |
| Dividend/contract | $500.00 | $400.00 | $100.00 | Dividend times number of shares per contract |
| On Termination Date: | | | | |
| Value/share | $135.00 | $110.00 | $100.00 | Assumed prices for companies 1 & 2, and combined contract value. 135 = 1.00 * 110 + .25 * 100 |
| Value/contract | $13,500 | $11,000 | $2,500 | Price per share * shares/cont |
| OWLS % Combined | | 74.07% | | Value of OWLS as a percent of the combined value 74.074% = 10,000/13,500 |
| OWLS value | $10,000 | $8,148.15 | $1,851.85 | Split based on the value of each company 8,148.15 = 11,000 * .74074 1,851.85 = 2,500 * .74075 |
| OWLS shares | | 74 | 18 | Number of shares of Co 1 & 2 |
| OWLS cash | | $8.15 | $51.85 | Cash in lieu of fractional shares |
| RISKS % Combined | | 25.93% | | Value of RISKS contract as a percent of the combined value 25.93% = 3,500/13,500 |
| RISKS value | $3,500 | $2,851.85 | $648.15 | Split based of the value of each company 2,851.85 = .2593 * 11,000 648.15 = .2593 * 2,500 |
| RISKS shares | | 25 | 6 | Number of shares of Co 1 & 2 |
| RISKS cash | | $101.85 | $48.15 | Cash in lieu of fractional shares |

For the remainder of the contract term, the adjustable DIVS contract holders receive the stream of dividends from both XYZ and ABC multiplied by the number of shares in the contract for each of these companies, which should be 4 shares of XYZ for every share of ABC. Upon termination of the contracts, XYZ is trading at the market price of $110/share while ABC trades at the market price of $100/share. An adjustable OWLS contract holder who initially owned 100 shares of XYZ with a TC of $100, has an adjustable derivative contract that is now backed by $11,000 (100 shares*$110) worth of XYZ stock and $2,500 worth of ABC stock (25 shares*$100), or $13,500 worth of the combined stocks. The adjustable OWLS contract holders, however, are only entitled to $10,000 of the $13,500 based on the original termination claim of $100 with respect to the original 100 pre-spin-off shares of XYZ. Accordingly, adjustable OWLS contract holders are only entitled to 74.074% ($10,000/$13,500) of the proceeds from each of XYZ and ABC, which entitles them to $8,148.15 of XYZ proceeds and $1,581.85 of ABC proceeds. The adjustable OWLS contract holders will be paid in the underlying shares of the companies with cash in lieu of fractional shares which translates to a distribution of 74 shares of XYZ stock plus $8.15 and 18 shares of ABC stock plus $51.85. The adjustable RISKS contract holders would receive the remainder of the proceeds equating to $3,500, which would be a distribution of $2,851.85 of XYZ proceeds (or 25 shares of XYZ plus $101.85) and $648.15 of ABC proceeds (or 6 shares of ABC plus $48.15).

From time to time a corporation that issued the stock underlying the adjustable derivative contracts will announce a stock split, resulting in the issuance of new shares of stock for each existing share. In accordance with an exemplary embodiment of the claimed invention as illustrated in Table 7, the adjustable derivative contracts adjust to account for a three for two stock splits. The holders of the underlying stock getting 1.5 shares of stock for each share she owned before the split is announced. Each investor in the underlying stock will get an additional half share of stock for each original share of stock, resulting in her having 1.5 times as many shares as originally and the price of each share is reduced by 33.33%, which is 1 divided by 1.5. Assuming there is no change in the dividend policy of the corporation, the dividend is reduced by 33.33% also. This results in the market value of the stock held by investors remaining the same before and after the split. The adjustable derivative contract of the claimed invention or the inventive method applied to the adjustable derivative contracts results in each adjustable derivative contract being backed by 1.5 shares for each original share. The adjustable derivative contracts of the claimed invention and the inventive method can be applied to any stock split announced by the corporation.

TABLE 7

STOCK SPLIT

Assumed Stock Parameters and Derivative Contract Prices

| Dividend | $5.00 | Stock Price | $105.00 |
|---|---|---|---|
| Days to Term | 1460 | RISKS Price | 15.32 |
| Years to Term | 4 | OWLS Price | 71.84 |
| Termination Claim | $100.00 | DIVS Price | 17.84 |
| Standard Deviation | 16% | | |
| Risk Free Rate | 6% | | |

1. Each of the derivative contracts will represent the number of shares each contract initially represented times the split ratio declared by the company.
2. The Termination Claim will remain the same.
3. The DIVS will receive the dividends paid on the underlying stock.
4. The Termination Settlement Date will remain the same.

3 SHARES FOR 2 SHARES STOCK SPLIT

| | Pre Split | | | Post Split | | |
|---|---|---|---|---|---|---|
| | Shares/Contract | Price/Share | Value | Shares/Contract | Price/Share | Value |
| Common Stock | 100 | 105.00 | $10,500.00 | 150 | 70.00 | $10,500.00 |
| RISKS Contract | 100 | 15.32 | $1,531.74 | 150 | 10.21 | $1,531.52 |
| OWLS Contract | 100 | 71.84 | $7,184.07 | 150 | 47.90 | $7,184.29 |
| DIVS Contract | 100 | 17.84 | $1,784.19 | 150 | 11.89 | $1,784.19 |
| Ann Stock Dividend | | 5 | | | 3.33 | |
| Termination Claim | | 100 | | | 66.67 | |

From time to time a corporation may increase the number of shares each investor in the corporation owns by declaring a stock dividend. As an example, the company may announce a 5.00% stock dividend. This results in each share holder receiving 5 new shares of stock for each 100 shares she owns, thereby increasing her holding to 105 shares for every 100 shares held by her previously. At the same time, the price of the stock will be reduced to reflect the increased number of shares outstanding, typically reducing the price by 1 divided by (one plus the dividend). In the example shown herein, the stock price is reduced to approximately 95.24% of its original value, with its actual price being determined by the market place. In accordance with an exemplary embodiment of the claimed invention as illustrated in Table 8, the adjustable derivative contracts will be underlain by the original number of shares plus the number of shares issued per original underlying share as a result of the stock dividend.

TABLE 8

STOCK DIVIDEND

Assumed Stock Parameters and Derivative Contract Prices

| Dividend | $5.00 | Stock Price | $105.00 |
| Days to Term | 1460 | RISKS Price | 15.32 |
| Years to Term | 4 | OWLS Price | 71.84 |
| Termination Claim | $100.00 | DIVS Price | 17.84 |
| Standard Deviation | 16% | | |
| Risk Free Rate | 6% | | |

1. The number of underlying shares each derivative contract represents is adjusted to reflect the number of new common stock shares issued per old share.
2. The Termination Claim remains the same.
3. The DIVS will receive dividends as paid on the underlying stock.
4. The Termination Settlement Date remains the same.

5.00% STOCK DIVIDEND

| | Pre Split | | | Post Split | | |
| --- | --- | --- | --- | --- | --- | --- |
| | Shares/Contract | Price/Share | Value | Shares/Contract | Price/Share | Value |
| Common Stock | 100 | 105.00 | $10,500.00 | 105 | 100.00 | $10,500.00 |
| RISKS Contract | 100 | 15.32 | $1,531.74 | 105 | 14.01 | $1,461.18 |
| OWLS Contract | 100 | 71.84 | $7,184.07 | 105 | 68.15 | $7,155.42 |
| DIVS Contract | 100 | 17.84 | $1,784.19 | 105 | 17.84 | $1,873.40 |
| Ann Stock Dividend | | 5 | | | 5.00 | |
| Termination Claim | | 100 | | | 95.24 | |

In accordance with an exemplary embodiment of the claimed invention, the methods for implementing the claimed invention can be implemented using processor-executable instructions for directing operation of a device or devices under processor control (e.g., processor based computer or server and the like), the processor-executable instructions can be stored on a tangible computer-readable medium, such as but not limited to a disk, CD, DVD, flash memory, portable storage or the like. The processor-executable instructions can be accessed from a service provider's website or stored as a set of downloadable processor-executable instructions, for example or downloading and installation from an Internet location (e.g. Web server).

In accordance with an exemplary embodiment of the claimed invention, a non-transitory computer readable storage medium comprises computer executable code for adjusting a derivative contract to account for time value of money due to an occurrence of a corporate event that affects the value of the derivative contract. The claimed code comprises instructions for adjusting an termination claim of the derivative contract to account for time value of money by a processor, thereby affecting the value of said derivative contract. The derivative contract is based on one of a plurality of economic interests of at least two shares of an underlying security. The claimed code further comprises instructions for the processor to adjust a term of the derivative contract based on distributions to the underlying security and to store the adjusted termination claim and the adjusted derivative contract in a database.

In accordance with an exemplary embodiment of the claimed invention, a system for adjusting a derivative contract to account for time value of money due to an occurrence of a corporate event that affects the value of the derivative contract comprises a processor and a database. The processor adjusts an termination claim of the derivative contract to account for time value of money, thereby affecting the value of the derivative contract, and adjusts a term of the derivative contract based on distributions to an underlying security. The derivative contract is based on one of a plurality of economic interests of at least two shares of the underlying security. The database stores the adjusted termination claim and the adjusted derivative contract.

In accordance with an exemplary embodiment of the claimed invention, the issuer can force a premature liquidation of the European style derivative contract if the adjusted terms of the derivative contract (i.e., European style derivative contract) becomes unattractive to the investors and does not trade or the trade volume is low.

While the claimed invention has been particularly described with respect to the illustrated embodiments, it will be appreciated that various alterations, modifications and adaptations may be made based on the present disclosure, and are intended to be within the scope of the claimed invention. It is appreciated that although the invention has been described with respect to two or three derivative contracts, each based on one of the economic interests of the underlying security, the disclosed invention may be similarly applied to any number of derivative contracts, each based on one of the economic interests of the underlying security. It is intended that the appended claims be interpreted as including the embodiments discussed above, the various alternatives that have been described, and all equivalents thereto.

What is claimed:

1. A computer-implemented method for adjusting terms of a derivative contract to account for time value of money due to an occurrence of a corporate event that affects the value of said derivative contract, comprising the steps of:

receiving, via a processor based computer, financial information regarding said derivative contract comprising at least a termination claim of said derivative contract and the length of said derivative contract, wherein each derivative contract represents one of two economic interests of at least two shares of an underlying security: a residual interest in stock (RISKS) contract representing a speculation on future gains of said at least two shares of the underlying security, and an option with limited stock (OWLS) contract representing the remaining value of said at least two shares of the underlying security absent the RISKS contract, and wherein the termination claim determines the payout to the OWLS contract at the end of said derivative contract;

receiving, via the computer, information identifying a corporate event that affects the value of said derivative contracts;

adjusting, via the computer, the termination claim of said derivative contact to its present value based at least on the length of time remaining on said derivative contract to account for the time value of money;

determining, via the computer, any needed formulas, from a plurality predefined formulas, for determining the effect of the corporate event on the RISKS contract and OWLS contract, wherein the determined formulas account for the time value of money;

adjusting, via the computer, the terms of the RISKS contract and the OWLS contract based on the determined formulas and the adjusted termination claim; and storing the adjusted termination claim, the adjusted RISKS contract, and the adjusted OWLS contract in a database.

2. The method of claim 1, wherein each derivative contracts represents one of three economic interests of said at least two shares of the underlying security: the RISKS contract, the OWLS contract, and a dividend value of stock (DIVS) contract representing a stream of dividends distributed to a holder of said at least two shares of the underlying security.

3. The method of claim 2, wherein said derivative contract is said DIVS contract; and further comprising the steps of adjusting the term of said DIVS contract based on a remaining stream of dividends expected on the underlying security by a processor of the computer and storing an adjusted DIVS contract in said database.

4. The method of claim 1, further comprising the steps of adjusting the term of said derivative contract by a processor of the computer based on at least one of the following: the amount of distributions related to said corporate event or the form of distributions related to said corporate event; and storing said adjusted derivative contract in said database.

5. The method of claim 1, further comprising the steps of calculating said adjusted termination claim by a processor of the computer based on at least one of the following: a risk free rate of return or a predetermined rate; and storing said adjusted termination claim in said database.

6. The method of claim 2, wherein said corporate event is a full liquidating dividend.

7. The method of claim 6, wherein said derivative contract is said DIVS contract; and further comprising the steps of adjusting a value of said DIVS contract to a present value of a remaining stream of dividends expected on the underlying security by a processor of the computer and storing an adjusted value of said DIVS contract in said database.

8. The method of claim 6, wherein said derivative contract is said OWLS contract; and further comprising the steps of adjusting the term of said OWLS contract to receive a payment that is lesser of a present value of a termination claim of said OWLS contract or the full liquidating dividend less payment to said DIVS contract, and storing an adjusted OWLS contract in said database.

9. The method of claim 2, wherein said corporate event is a partial liquidating dividend; wherein said derivative contract is said DIVS contract; and further comprising the steps of adjusting the value of said DIVS contract to a present value of a remaining stream of dividends expected on the underlying security which will no longer be paid due to the partial liquidating dividend by a processor of the computer, and storing an adjusted value of said DIVS contract in said database.

10. The method of claim 9, wherein said derivative contract is said OWLS contract; and further comprising the steps of adjusting the terms of said OWLS contract to receive a payment that is lesser of a present value of a termination claim of said OWLS contract or the partial liquidating dividend less payment to said DIVS contract, and storing an adjusted OWLS contract in said database.

11. The method of claim 10, further comprising the steps of adjusting said termination claim based on a future value of the partial liquidating dividend paid to said OWLS contract by a processor of the computer; and storing said adjusted termination claim in said database.

12. The method of claim 2, wherein said corporate event is a special dividend; wherein said derivative contract is said DIVS contract; and further comprising the steps of:
    adjusting the value of said DIVS contract to receive a specified percentage of the special dividend by a processor of the computer;
    adjusting said termination claim based on a future value of the special dividend less any distribution made to said DIVS contract by said processor; and
    storing said adjusted termination claim and an adjusted value of said DIVS contract in said database.

13. The method of claim 12, wherein said derivative contract is said OWLS contract; and further comprising the steps of adjusting the term of said OWLS contract to receive a payment that is lesser of a present value of a termination claim of said OWLS contract or the special dividend less payment to said DIVS contract, and storing an adjusted OWLS contract in said database.

14. The method of claim 1, further comprising the steps of adjusting said termination claim based on a change in structure of the underlying security due to said corporate event; and storing said adjusted termination claim in said database.

15. The method of claim 14, wherein said corporate event is a spin-off or split-up resulting in multiple entities; and further comprising the steps of allocating said termination claim amongst said multiple entities and storing allocation of said termination claim amongst said multiple entities in said database.

16. The method of claim 1, wherein said derivative contract is an European style derivative contract; and further comprising the step of forcing a premature liquidation of said European style derivative contract.

17. The method of claim 1, wherein said corporate event is a full liquidating dividend; wherein said derivative contract is said OWLS contract; and further comprising the steps of:
    adjusting the term of said OWLS contract to receive the full liquidating dividend up to said adjusted termination claim;
    storing said adjusted termination claim and an adjusted OWLS contract in said database.

18. The method of claim 1, wherein said corporate event is a partial liquidating dividend; wherein said derivative contract is said OWLS contract; and further comprising the steps of:

adjusting the term of said OWLS contract to receive the partial liquidating dividend up to a present value of the termination claim of said OWLS contract;
adjusting said termination claim based on a future value of the partial liquidating dividend paid to said OWLS contract by a processor of the computer; and
storing said adjusted termination claim and an adjusted OWLS contract in said database.

19. The method of claim 1, wherein said corporate event is a special dividend; wherein said derivative contract is said OWLS contract; and further comprising the steps of:
adjusting the term of said OWLS contract to receive the special dividend up to a present value of a termination claim of said OWLS contract;
adjusting said termination claim based on a future value of the special dividend paid to said OWLS contract by a processor of the computer; and
storing said adjusted termination claim and an adjusted OWLS contract in said database.

20. A non-transitory computer readable storage medium comprising computer executable code for adjusting terms of a derivative contract to account for time value of money due to an occurrence of a corporate event that affects the value of said derivative contract, said code comprising instructions for:
receiving, via a processor based computer, financial information regarding said derivative contract comprising at least a termination claim of said derivative contract and the length of said derivative contract, wherein each derivative contract represents one of two economic interests of at least two shares of an underlying security: a residual interest in stock (RISKS) contract representing a speculation on future gains of said at least two shares of the underlying security, and an option with limited stock (OWLS) contract representing the remaining value of said at least two shares of the underlying security absent the RISKS contract, and wherein the termination claim determines the payout to the OWLS contract at the end of said derivative contract;
receiving, via the computer, information identifying a corporate event that affects the value of said derivative contracts;
adjusting, via the computer, the termination claim of said derivative contact to its present value based at least on the length of time remaining on said derivative contract to account for the time value of money;
determining, via the computer, any needed formulas, from a plurality predefined formulas, for determining the effect of the corporate event on the RISKS contract and OWLS contract, wherein the determined formulas account for the time value of money;
adjusting, via the computer, the terms of the RISKS contract and the OWLS contract based on the determined formulas and the adjusted termination claim; and
storing the adjusted termination claim, the adjusted RISKS contract, and the adjusted OWLS contract in a database.

21. The computer readable storage medium of claim 20, wherein said code further comprises instructions for dividing a value of said at least two shares of the underlying security into a plurality of derivative contracts, each derivative contract representing one of three economic interests of said at least two shares of the underlying security: the RISKS contract, the OWLS contract, and a dividend value of stock (DIVS) contract representing a stream of dividends distributed to a holder of said at least two shares of the underlying security.

22. The computer readable medium of claim 21, wherein said derivative contract is said DIVS contract; and wherein said code further comprises instructions for adjusting the term of said DIVS contract based on a remaining stream of dividends expected on the underlying security by a processor of the computer and storing an adjusted DIVS contract in said database.

23. The computer readable medium of claim 21, wherein said code further comprises instructions for:
adjusting the term of said derivative contract by a processor of the computer based on at least one of the following: the amount of distributions related to said corporate event or the form of distributions related to said corporate event;
adjusting said termination claim by said processor based on at least one of the following: a risk free rate of return or a predetermined rate; and
storing said adjusted derivative contract and said adjusted termination claim in said database.

24. The computer readable medium of claim 21, wherein said derivative contract is said DIVs contract; wherein said corporate event is a full liquidating dividend; and wherein said code further comprises instructions for:
adjusting a value of said DIVS contract to a present value of a remaining stream of dividends expected on the underlying security by said processor;
adjusting said termination claim to the present value of said termination claim by a processor of the computer and
storing said adjusted termination claim and an adjusted value of said DIVS contract in said database.

25. The computer readable medium of claim 24, wherein said derivative contract is said OWLS contract; and wherein said code further comprises instructions for adjusting the term of said OWLS contract to receive a payment that is lesser of a present value of a termination claim of said OWLS contract or the full liquidating dividend less payment to said DIVS contract, and storing an adjusted OWLS contract in said database.

26. The computer readable medium of claim 21, wherein said corporate event is a partial liquidating dividend; wherein said derivative contract is said DIVS contract; and wherein said code further comprises instructions for: adjusting the value of said DIVS contract to a present value of a remaining stream of dividends expected on the underlying security which will no longer be paid due to the partial liquidating dividend by a processor of the computer; and storing an adjusted value of said DIVS contract in said database.

27. The computer readable medium of claim 26, wherein said derivative contract is said OWLS contract; and wherein said code further comprises instructions for: adjusting the terms of said OWLS contract to receive a payment that is lesser of a present value of a termination claim of said OWLS contract or the partial liquidating dividend less payment to said DIVS contract; and storing an adjusted OWLS contract in said database.

28. The computer readable medium of claim 27, wherein said code further comprises instructions for adjusting said termination claim based on a future value of the partial liquidating dividend paid to said OWLS contract by said processor; and storing said adjusted termination claim in said database.

29. The computer readable medium of claim 21, wherein said corporate event is a special dividend; wherein said derivative contract is said DIVS contract; and wherein said code further comprises instructions for:

adjusting the value of said DIVS contract to receive a specified percentage of the special dividend by a processor of the computer;

adjusting said termination claim based on a future value of the special dividend less any distribution made to said DIVS contract by said processor; and storing said adjusted termination claim and an adjusted value of said DIVS contract in said database.

30. The computer readable medium of claim 29, wherein said derivative contract is said OWLS contract; and wherein said code further comprises instructions for: adjusting the term of said OWLS contract to receive a payment that is lesser of a present value of a termination claim of said OWLS contract or the special dividend less payment to said DIVS contract; and storing an adjusted OWLS contract in said database.

31. A system for adjusting terms of a derivative contract to account for time value of money due to an occurrence of a corporate event that affects the value of said derivative contract, comprising:

a processor based computer programmed to:

receiving financial information regarding said derivative contract comprising at least a termination claim of said derivative contract and the length of said derivative contract, wherein each derivative contract represents one of two economic interests of at least two shares of an underlying security: a residual interest in stock (RISKS) contract representing a speculation on future gains of said at least two shares of the underlying security, and an option with limited stock (OWLS) contract representing the remaining value of said at least two shares of the underlying security absent the RISKS contract, and wherein the termination claim determines the payout to the OWLS contract at the end of said derivative contract;

receiving information identifying a corporate event that affects the value of said derivative contracts;

adjusting the termination claim of said derivative contact to its present value based at least on the length of time remaining on said derivative contract to account for the time value of money;

determining any needed formulas, from a plurality predefined formulas, for determining the effect of the corporate event on the RISKS contract and OWLS contract, wherein the determined formulas account for the time value of money;

adjusting the terms of the RISKS contract and the OWLS contract based on the determined formulas and the adjusted termination claim; and a database to store the adjusted termination claim, the adjusted RISKS contract, and the adjusted OWLS contract.

32. The system of claim 31, wherein a processor of the computer allocates a value of said at least two shares of the underlying security to a plurality of derivative contracts, each derivative contract representing one of three economic interests of said at least two shares of the underlying security: the RISKS contract, the OWLS contract, and a dividend value of stock (DIVS) contract representing a stream of dividends distributed to a holder of said at least two shares of the underlying security.

33. The system of claim 32, wherein said derivative contract is said DIVS contract; wherein said processor adjusts the term of said DIVS contract based on a remaining stream of dividends expected on the underlying security and wherein said database stores an adjusted DIVS contract.

34. The system of claim 32, wherein said processor adjusts the term of said derivative contract based on at least one of the following: the amount of distributions related to said corporate event or the form of distributions related to said corporate event; wherein said processor adjusts said termination claim based on at least one of the following: a risk free rate of return or a predetermined rate; and wherein said database stores said adjusted derivative contract.

35. The system of claim 32, wherein said derivative contract is said DIVS contract; wherein said corporate event is a full liquidating dividend; wherein said processor adjusts a value of said DIVS contract to a present value of a remaining stream of dividends expected on the underlying security; wherein said processor adjusts said termination claim to the present value of said termination claim; and wherein said database stores said adjusted termination claim and an adjusted value of said DIVS contract.

36. The system of claim 35, wherein said derivative contract is said OWLS contract; and wherein said processor adjusts the term of said OWLS contract to receive a payment that is lesser of a present value of a termination claim of said OWLS contract or the full liquidating dividend less payment to said DIVS contract; and wherein said database stores an adjusted OWLS contract.

37. The system of claim 32, wherein said corporate event is a partial liquidating dividend; wherein said derivative contract is said DIVS contract; wherein said processor adjusts the value of said DIVS contract to a present value of a remaining stream of dividends expected on the underlying security which will no longer be paid due to the partial liquidating dividend by said processor; and wherein said database stores an adjusted value of said DIVS contract.

38. The system of claim 37, wherein said derivative contract is said OWLS contract; and wherein said processor adjusts the terms of said OWLS contract to receive a payment that is lesser of a present value of a termination claim of said OWLS contract or the partial liquidating dividend less payment to said DIVS contract; and wherein said database stores an adjusted OWLS contract.

39. The system of claim 38, wherein said processor adjusts said termination claim based on a future value of the partial liquidating dividend paid to said OWLS contract; and wherein said database stores said adjusted termination claim.

40. The system of claim 32, wherein said corporate event is a special dividend; wherein said derivative contract is said DIVS contract; wherein said processor adjusts the value of said DIVS contract to receive a specified percentage of the special dividend; wherein said processor adjusts said termination claim based on a future value of the special dividend less any distribution made to said DIVS contract; and wherein said database stores said adjusted termination claim and an adjusted value of said DIVS contract.

41. The system of claim 40, wherein said derivative contract is said OWLS contract; and wherein said processor adjusts the term of said OWLS contract to receive a payment lesser of a present value of a termination claim of said OWLS contract or the special dividend less payment to said DIVS contract; and wherein said database stores an adjusted OWLS contract.

* * * * *